United States Patent [19]

Carney

[11] Patent Number: 5,697,059
[45] Date of Patent: Dec. 9, 1997

[54] SYSTEM FOR DYNAMICALLY ALLOCATING CHANNELS AMONG BASE STATIONS IN A WIRELESS COMMUNICATION SYSTEM

[75] Inventor: Ronald R. Carney, Palm Bay, Fla.

[73] Assignee: AirNet Communications Corp., Melbourne, Fla.

[21] Appl. No.: 739,862

[22] Filed: Oct. 31, 1996

Related U.S. Application Data

[63] Continuation of Ser. No. 246,181, May 19, 1994, abandoned.

[51] Int. Cl.$^6$ .................................................. H04Q 7/20
[52] U.S. Cl. .................. 455/34.1; 455/34.2; 455/53.1; 455/56.1; 455/62; 379/59
[58] Field of Search ..................... 455/33.1, 34.1, 455/34.2, 62, 67.1, 53.1, 56.1, 8, 33.2, 63, 54.1, 54.2; 379/59, 60

[56] References Cited

U.S. PATENT DOCUMENTS

| | | |
|---|---|---|
| 4,144,496 | 3/1979 | Cunningham et al. . |
| 4,578,815 | 3/1986 | Persinotti .............................. 455/62 |
| 4,670,899 | 6/1987 | Brody et al. . |
| 4,747,101 | 5/1988 | Akaiwa et al. ...................... 379/59 |

(List continued on next page.)

FOREIGN PATENT DOCUMENTS

| | | |
|---|---|---|
| 0585994A2 | 3/1994 | European Pat. Off. . |
| 6083188 | 4/1993 | Japan ............................. 455/34.1 |
| 0244071 | 9/1993 | Japan ............................. 455/34.1 |
| 2234142 | 1/1991 | United Kingdom . |
| 2266433 | 10/1993 | United Kingdom . |
| 93/14579 | 7/1993 | WIPO . |

OTHER PUBLICATIONS

Sallberg et al, "Hybrid Channel Assignment and Reuse Partitioning in a Cellular Mobile Telephone System", Jun. 1987.

Tajima, Jun., "A Strategy for Flexible Channel Assignment in Mobile Communication Systems", *IEEE Transactions on Vehicular Technology*, vol. 37, No. 2, May 1988.

Chih–Lin I et al., "Local Packing –Distributed Dynamic Channel Allocation at Cellular Base Station", *IEEE Telecommunications Conference*, IEEE Communications Society, 1993.

*Primary Examiner*—Reinhard J. Eisenzopf
*Assistant Examiner*—Doris To
*Attorney, Agent, or Firm*—Hamilton, Brook, Smith & Reynolds, P.C.

[57] ABSTRACT

A wireless communication system includes a plurality of wideband base stations and a cluster controller that dynamically controls channel allocations among the base stations. When a base station can not service a radio telephone terminal within its cell site, the base station polls the channels and sends a request for a channel to the controller, listing in the request the channels the station determines at the cell site to be inactive. The controller consults a load statistics table to determine if a first listed channel is free over the system. If so, the controller allocates the channel to the base station, if not the controller searches the table for a free channel. The controller may also include channel usage rates in the table. These rates indicate for a predetermined period of time for each base station the rate at which the base station assigns channels to the terminals and the number of channel in use simultaneously. The controller checks the channel usage rate associated with the base station to which the free channel is allocated to determine if the rate is below a predetermined maximum value. If so, the controller allocates the channel. Otherwise, the controller searches the table for a next free listed channel, and so forth. The controller may also preallocate channels to the base station based on expected use. To determine expected use, the controller accumulates the channel usage information over a number of predetermined periods of time and determines a pattern of use, if possible. The controller then, at appropriate times, i.e., when the pattern indicate changes in usage, preallocates channels from the base stations with low expected use to the base stations with high expected use.

19 Claims, 9 Drawing Sheets

U.S. PATENT DOCUMENTS

| | | |
|---|---|---|
| 4,771,448 | 9/1988 | Koohgoli et al. . |
| 4,851,830 | 7/1989 | Andros et al. . |
| 4,853,688 | 8/1989 | Andros et al. . |
| 4,857,915 | 8/1989 | Andros et al. . |
| 4,878,051 | 10/1989 | Andros et al. . |
| 4,935,732 | 6/1990 | Andros et al. . |
| 4,940,963 | 7/1990 | Gutman et al. . |
| 4,989,231 | 1/1991 | Ashikawa .............................. 455/34.2 |
| 5,034,993 | 7/1991 | Sasuta et al. ........................... 455/34.1 |
| 5,039,984 | 8/1991 | Andros et al. . |
| 5,052,049 | 9/1991 | Andros et al. . |
| 5,109,528 | 4/1992 | Uddenfeldt . |
| 5,122,795 | 6/1992 | Cubley et al. . |
| 5,157,709 | 10/1992 | Ohteru ...................................... 455/63 |
| 5,230,082 | 7/1993 | Ghisler et al. . |
| 5,384,827 | 1/1995 | Orikasa ...................................... 379/61 |
| 5,404,355 | 4/1995 | Raith ...................................... 455/54.1 |
| 5,475,868 | 12/1995 | Duque-Anton et al. . |

FIG. 5

CLUSTER CONTROLLER
LOAD STATISTICS TABLE

| CHANNEL | STA | STATUS | STA USE RATE |
|---|---|---|---|
| | | | |
| | | | |

FIG. 7

CLUSTER CONTROLLER
LOAD STATISTICS TABLE

| CHANNEL | STA | STATUS | STA USE RATE | EXPECTED STA USE RATE |
|---|---|---|---|---|
| | | | | |
| | | | | |
| | | | | |

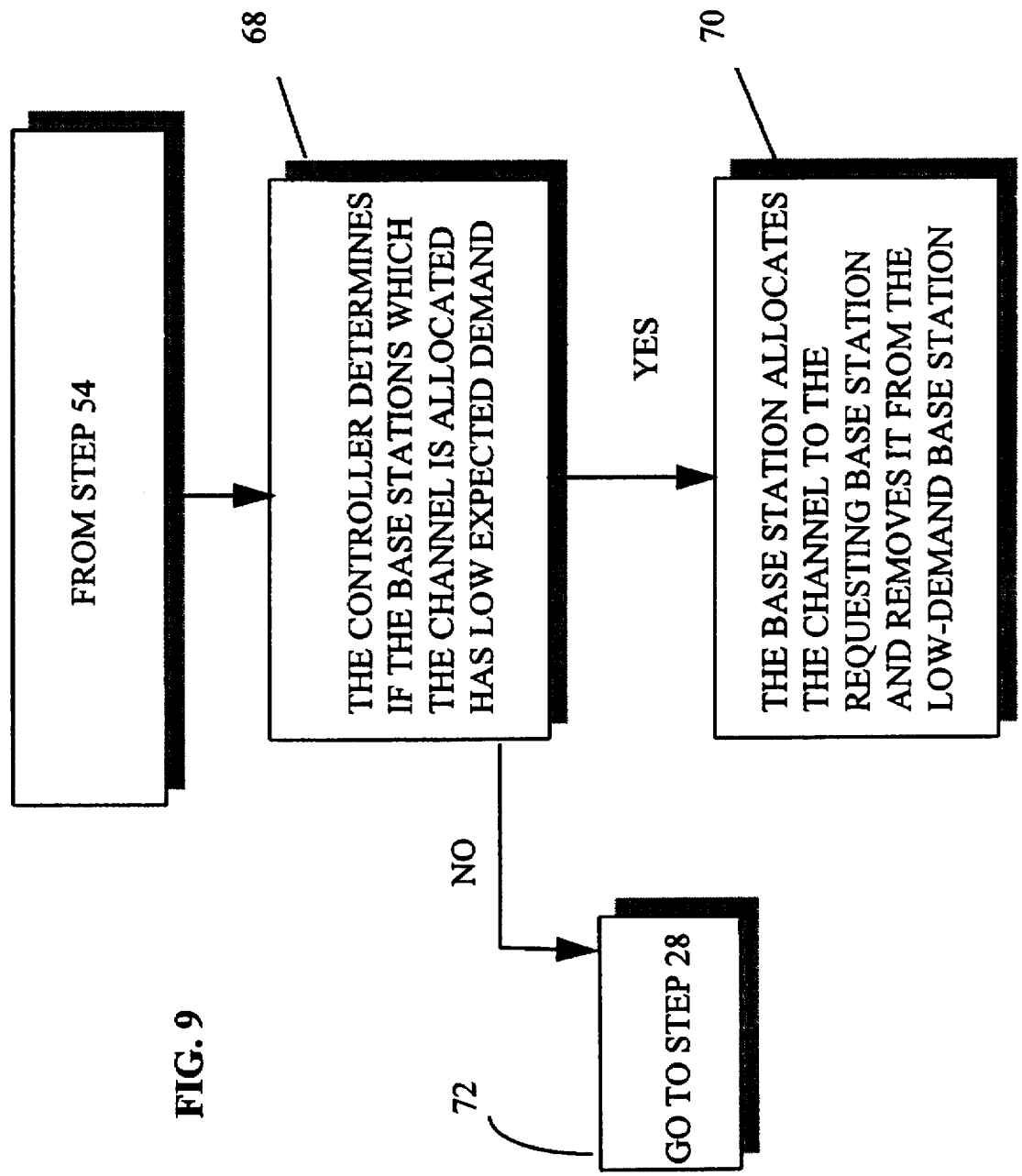

SYSTEM FOR DYNAMICALLY ALLOCATING CHANNELS AMONG BASE STATIONS IN A WIRELESS COMMUNICATION SYSTEM

This is a continuation of application Ser. No. 08/246,181, filed May 19, 1994 which is now abandoned.

FIELD OF THE INVENTION

This invention relates generally to wireless communication systems, and more particularly, to dynamic allocation of communication channels among base stations in wireless communication systems.

BACKGROUND

Wireless cellular communication Systems transmit information to and from mobile telephone units, or terminals, operating within their territory. Each of the systems communicates with these terminals over a number of channels within a specified frequency range assigned to the system by, for example, a government agency such as the Federal Communications Commission.

Each system allocates the channels within its assigned range among a plurality of base stations, which are strategically positioned throughout the system's territory. Each base station operates within a predetermined area, or cell site, and services the terminals located or traveling in the site. To service a terminal, that is, to enable the terminal to participate in a call, the base station assigns to it one of the allocated channels. The base station also connects this channel, through one or more switches, to a land-based telephone line or to another wireless channel, as appropriate, to complete the call.

Before the channels are allocated among the base stations, an extensive study is often performed to determine how best to allocate the channels over the terrain covered by the system, to make channels available throughout the entire terrain with minimum interference. The study also determines how to re-use channels, i.e. allocate respective channels to more than one base station, to maximize channel availability. The channels are then permanently allocated to the respective base stations in accordance with the study, and transceivers housed in each of the base stations are tuned, respectively, to the appropriate channels.

The base stations can simultaneously service, on any given channel, up to a maximum number, n, of terminals. For example, a system operating under the IS-54B protocol and utilizing full encoding can simultaneously service up to three (i.e., n=3) terminals per channel. As wireless communication, and thus, terminals, become more and more popular, the demand for channels increases. Accordingly, base stations servicing certain high traffic areas may require additional channels.

Before an additional channel can be allocated to a base station, however, the possibility of interference with the channels of neighboring base stations must be determined, an additional transceiver must be installed and tuned to the appropriate channel, and the base station's switching circuitry must be updated to include the additional transceiver. Accordingly, adding a channel to a base station in such a system is both costly and time consuming. These systems thus cannot easily adapt to meet the increased demand.

Recently, personal communications services (PCS's) have been developed to handle communications within relatively small areas, for example, within a complex of buildings. PCS's typically include a number of relatively low-power base stations that service only terminals located within the complex. The PCS base stations, like the base stations of the higher-powered wireless communications systems, are allocated a number of channels over which to communicate with the terminals. As the terminals move throughout the complex, certain base stations may experience demands for channels that exceed their allocated capacity.

The PCS's are not generally under the control of the government agencies that assign the larger frequency ranges to the higher-powered wireless communication systems. Thus a PCS may use frequencies, i.e., channels, that are already in use by a higher-powered base station in the same area. Depending on the frequencies used by the PCS and the location of the PCS within the cell site associated with the higher-powered base station, the communications of the two systems over certain channels may interfere with one another.

If such interference occurs, various channels must be re-allocated, if possible, or go unused, to remove from the affected base stations the channels over which interference occurs. For example, certain channels may be re-allocated in the higher-powered system to base stations that are located away from the PCS. Such a re-allocation of channels involves at least the re-tuning of the transceivers in the affected higher-powered base stations. It may also require the re-tuning of transceivers at a number of other base stations, should a change in the channels allocated to these stations be required to avoid interference with the newly allocated channels. This procedure is both time consuming and costly. If re-allocation is not possible, certain channels may be unusable by the affected base stations, which may be any base station in the PCS. This effectively reduces the allocated capacities of these base stations.

What is needed is a wireless communications system that can readily adapt to changes in its operating environment, whether the changes are attributable to increased demand for channels, the installation of one or more PCS's in the area, or both.

SUMMARY OF INVENTION

The invention is a system for dynamically allocating communication channels among a plurality, or "cluster," of wideband base stations. The system includes a central cluster controller that allocates the channels among the base stations based on current demand for channels, i.e., at the requests of the respective base stations; expected demand for channels; or both. The wideband base stations each include a wideband transceiver that is capable of operating simultaneously on any number of the channels within the frequency range assigned to the associated service provider. Each wideband base station can poll every channel to determine signal activity, and thus, dynamically determine which of the channels will potentially interfere with the operations of neighboring base stations. Further, these transceivers can transmit essentially simultaneously over any or all of the channels, which enables them to operate with newly allocated channels.

More specifically, the cluster controller maintains a load statistics table that indicates for each channel at least the base stations to which it is allocated and its current status in the system, i.e., whether it is then assigned to a terminal or is then free. The information on the current status of the channels is obtained directly from the base stations. They each send contemporaneous notices to the controller, detailing channel assignments and channel releases.

In a first embodiment of the system, the base stations send requests for additional channels to the cluster controller. Before sending a request, a base station surveys its environment by polling the channels in the system and determining which of these channels are "inactive," i.e., have no detectable signals at that cell site. The station then sends to the cluster controller as part of the request a list of one or more of the channels that it has determined are inactive.

In response to the request, the controller consults its load statistics table and determines the current status of the first channel on the fist. If the channel is free, the controller reallocates it from the base station to which it is currently allocated to the requesting base station. To do this the controller sends a message to both base stations, informing them of the channel reallocation. These base stations then update their respective internal tables of allocated channels, and the controller updates its load statistics table.

The controller may also store in its load statistics table information relating to the rates at which each base station uses channels. This information includes for each base station the number of channels assigned by the base station over a predetermined period of time and the number of these channels that are simultaneously in use over this time period. From this accumulated information the controller determines channel use rates for the base stations. If the channel use rate of a base station exceeds a predetermined maximum value, it indicates that the base station requires the channels currently allocated to it, to handle current demand. Accordingly, the controller checks the channel use rate associated with a free channel before re-allocating the channel and does not re-allocate the channel if the associated rate exceeds the predetermined maximum value. The controller then re-enters the table with a next channel from the list and determines if this channel should be re-allocated, and so forth.

In an alternative embodiment of the system, the controller accumulates information relating to the channel usage of each of the base stations over predetermined periods of time, for example, over days, hours, and so forth. Using this accumulated information, the controller determines patterns of use. Then, based on these patterns the cluster controller, at its own initiative and at selected times, "preallocates" the channels among the base stations. At a designated time, the controller thus removes channels from the base stations that are then expected to have low demand and allocates these channels to base stations that are then expected to have high demand. By preallocating these channels, the controller enables the high-demand stations to handle their expected increased use without having to acquire the additional channels one-by-one through a series of requests to the controller.

For example, the controller may determine that the base stations that are located in a city have a high demand for channels during the week and a low demand for channels on weekends; and the base stations located in the suburbs have a high demand for channels on the weekends and a low demand for channels during the week. At the start of the week, the controller preallocates more channels to the city base stations and fewer channels to the suburban base stations and at the start of the weekend does just the opposite.

If the controller accumulates and analyzes information based on the hours of the day, the controller may determine that particular base stations have high demand during specific hours, while other base stations have correspondingly low demand. The controller can then preallocate channels from the low-demand base stations to the high-demand base stations at the appropriate hours. For example, the controller may preallocate more channels during rush hours to the base stations on commuter routes and at the same time fewer channels to the base stations on either end of these travel routes.

When the actual demand for channels exceeds the expected demand at a particular base station, that base station surveys its environment and sends to the cluster controller a request for an additional channel. The controller then consults its load statistics table to determine which of the channels on the list is currently both free and allocated to a base station that is expected to have low demand. If one of the channels meets both criteria, the controller allocates it to the requesting base station. Otherwise, the controller may leave the channel with the base station to which it is currently allocated or may reallocate it to the requesting base station, depending on the priorities of the service provider, as discussed below.

In either embodiment, the controller may re-use one of the listed channels, by allocating the channel to the requesting base station without removing it from the base station to which it is currently assigned. The controller need not determine if the re-use will cause interference, however, since the requesting base station has already determined that it cannot detect signals transmitted over this channel.

BRIEF DESCRIPTION OF THE DRAWINGS

The above and further advantages of the invention may be better understood by referring to the following description in conjunction with the accompanying drawings, in which:

FIG. 5 is a more detailed functional block diagram of the cluster controller depicted in FIG. 1, constructed in accordance with a second embodiment of the current invention;

FIG. 7 is a functional block diagram of the cluster controller depicted in FIG. 1, constructed in accordance with a second embodiment of the current invention;

FIG. 9 is a flow chart of additional operations of the cluster controller depicted in FIG. 6.

DETAILED DESCRIPTION OF THE INVENTION

Figure 1:
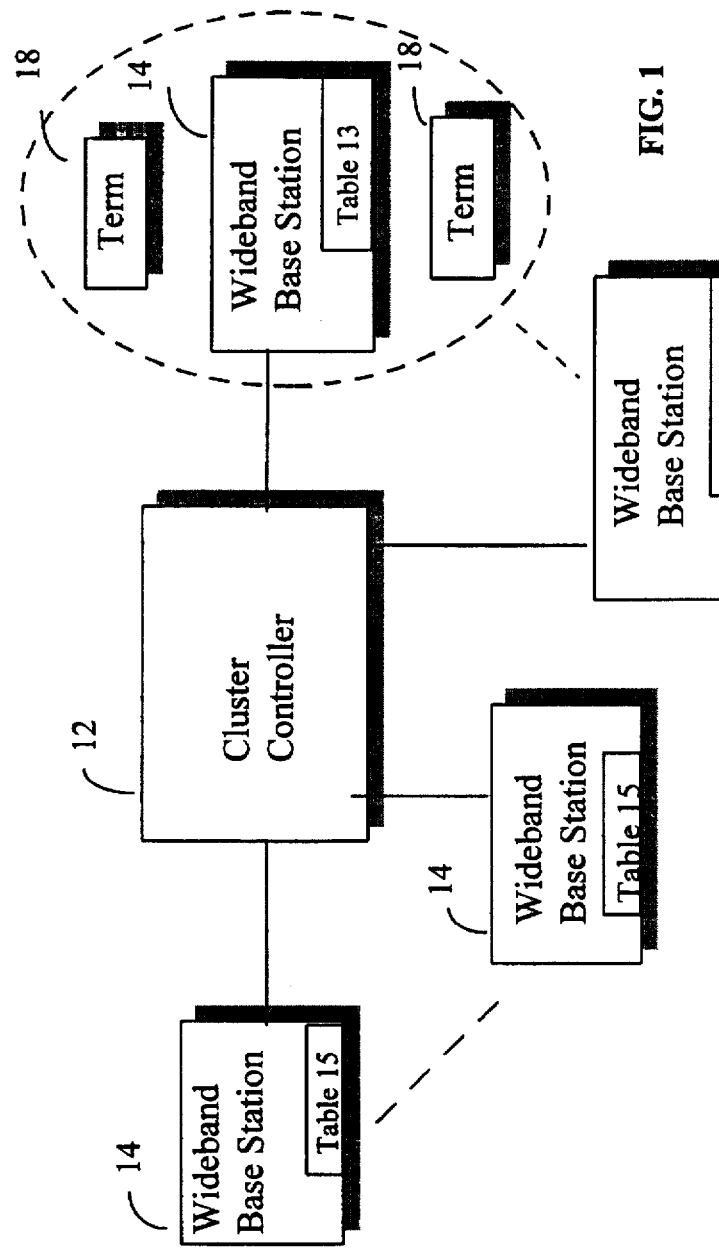
FIG. 1 is a block diagram of a wireless communication system constructed in accordance with the current invention, the system including a plurality of wideband base stations and a cluster controller.

Referring to FIG. 1, a wireless communication system 10 includes a cluster controller 12 that controls the allocation of channels among a plurality of wideband base stations 14. Each wideband base station 14 operates over an associated cell site 16 and services terminals 18 therein, by assigning to them, as needed, the channels then allocated to the station.

Each of the wideband base stations 14 is capable of simultaneously utilizing any and all of channels available to the wireless communication system 10. Currently, systems such as Advanced Mobile Phone Systems are assigned frequency ranges of over 12 Mhz, which include well over 400 channels. The communication system 10 similarly may utilize many hundreds of channels.

The wideband base stations, which are discussed in more detail in copending patent application Ser. No. 08/224,754 entitled Transceiver Apparatus Employing Wideband FFT Channelizer With Output Sample Timing, Adjustment and Inverse FFT Combiner for Multichannel Communication Network, include transceivers which are capable of polling all of the channels available to the system, to detect signal activity on the respective channels. These transceivers are also capable of transmitting or receiving signals essentially simultaneously over any or all of the channels. Basically, each of the station 14 includes a transceiver that has, for processing received signals, a wideband Discrete Fourier Transform channelizer and a plurality of filters and digital signal processors for reproducing from received communications signals digital signals that represent communications over the individual channels. The transceiver also includes, for transmitting signals, a second plurality Of digital signal processors and an inverse Discrete Fourier Transform combiner that together produce a combined signal that represents the plurality the individual channel signals, and a multi channel transmitter that transmits an associate multiple frequency communication signal. Each base station 14 maintains an internal table 15, listing the channels allocated to the station by the controller and processes the communications signals that it receives and transmits in accordance with the allocated channels.

Figure 2:
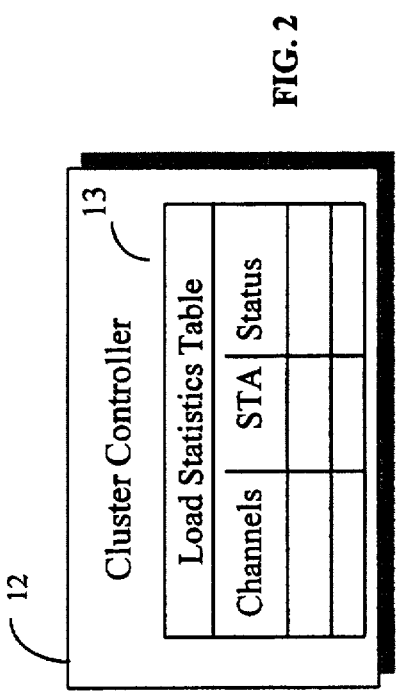
FIG. 2 is a functional block diagram of the cluster controller depicted in FIG. 1, constructed in accordance with a first embodiment of the current invention.

Referring now also to FIG. 2, the cluster controller 12 maintains a load statistics table 13 which lists for each of the channels available through the controller, the base station 14 to which the channel is allocated and the current status of the channel, that is, whether the channel is then assigned to a terminal, i.e., in use, or is then free over the entire system 10. The controller determines the current status of the channels using information forwarded to it by the base stations. Each station sends a report to the controller every time it assigns a channel to a terminal and every time it releases, or frees, a channel.

When the cluster controller 12 is powered up, it allocates the channels among the base stations 14 according to a default scheme, such as a uniform distribution. Thereafter, the cluster controller 12 dynamically re-allocates the channels among the base stations, depending on the current demand for channels; the expected demand for channels; or both.

In a first embodiment of the system 10, the controller 12 dynamically allocates the channels to the wideband base stations 14 in response to requests for additional channels from the individual base stations. It thus allocates the channels based on current demand. A base station issues a request whenever it lacks an available channel to assign to a terminal 18 that requires service.

Figure 3A:
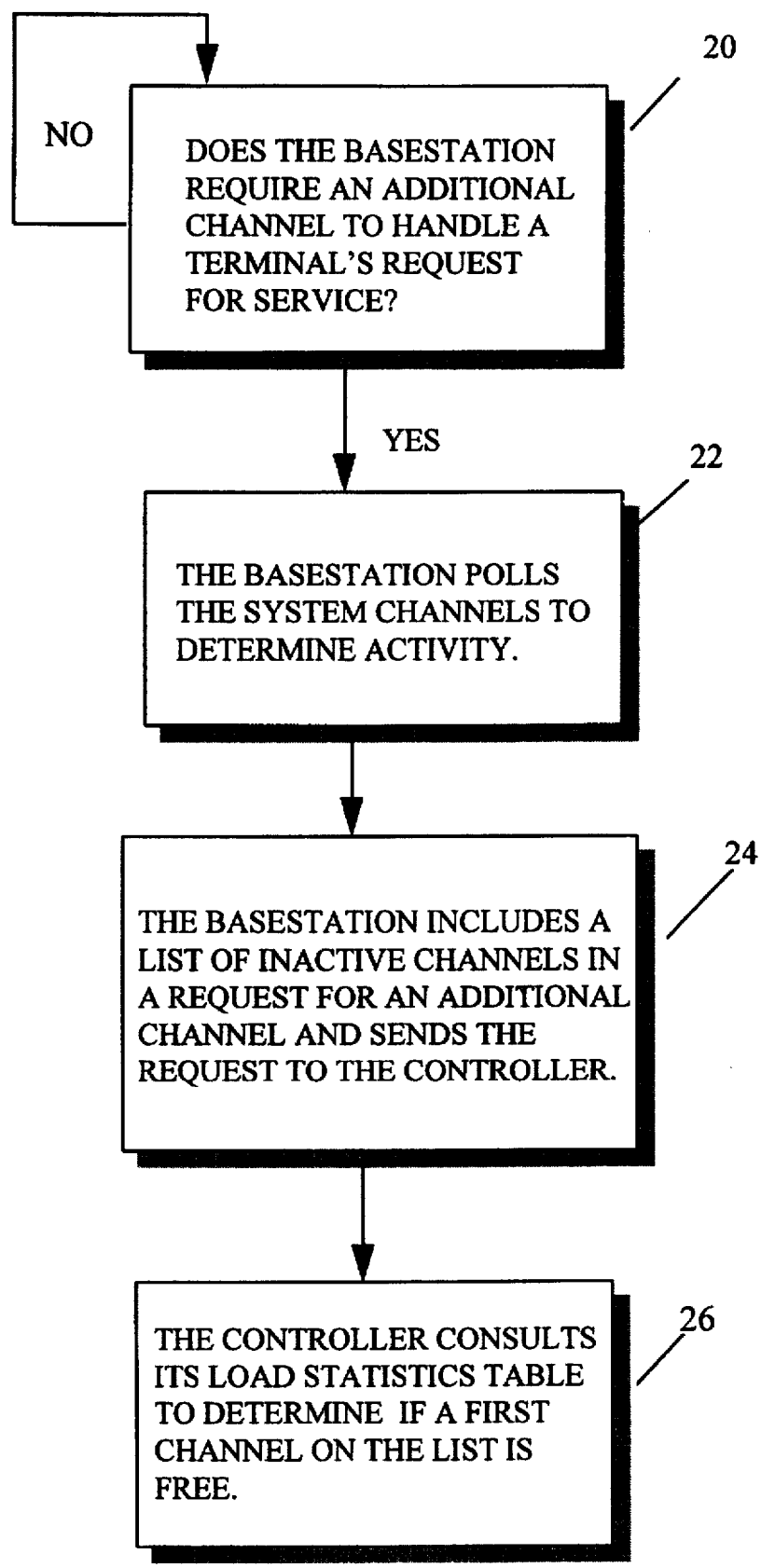
FIGS. 3A and 3B together are a flow chart of the operations of the cluster controller depicted in FIG. 2 and the plurality of wideband base stations depicted in FIG. 1.
Figure 3B:
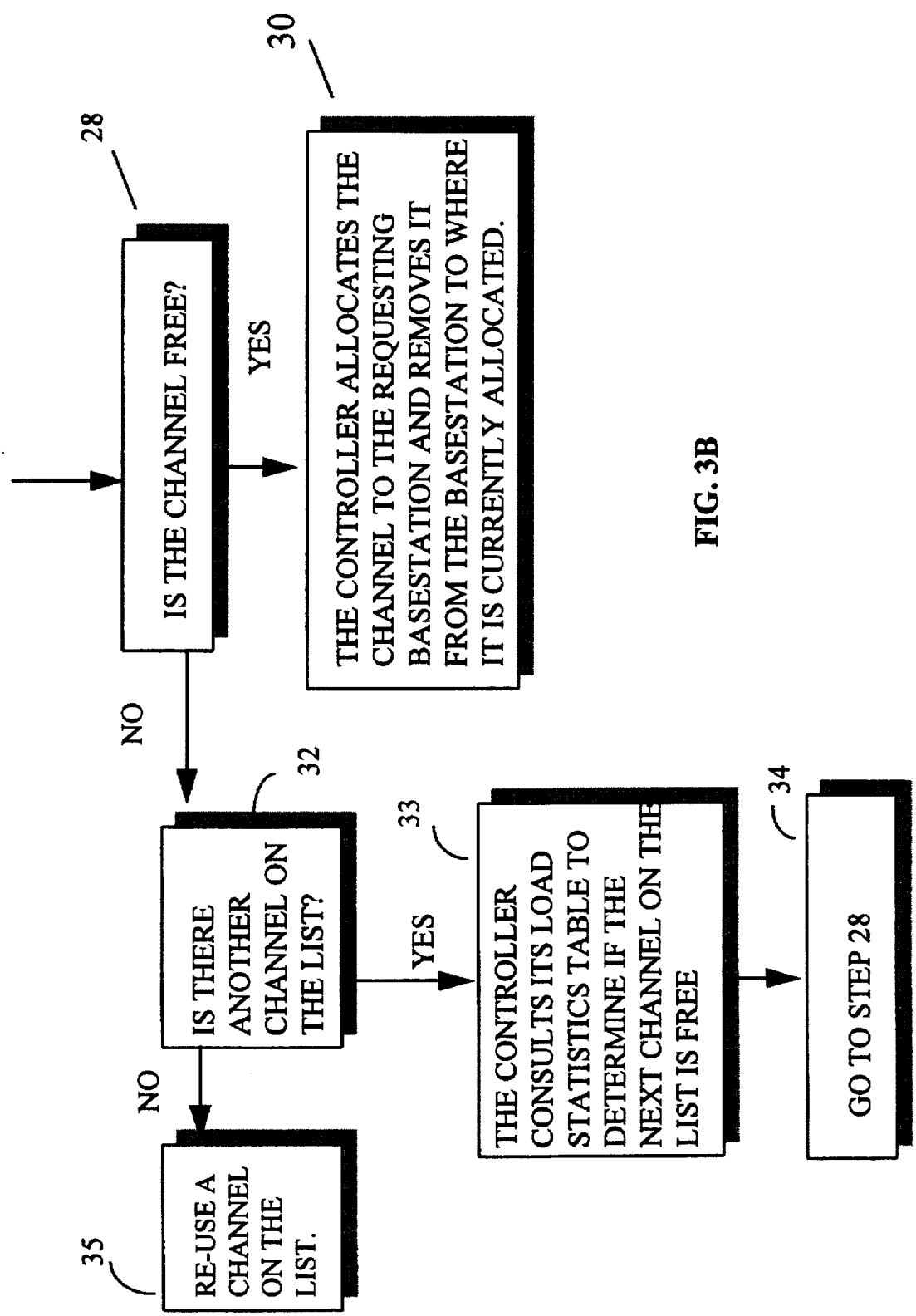

Referring now also to FIGS. 3A–3B, when a base station 14 determines it requires another channel it surveys its environment by polling the system channels to determine signal activity on each of the channels (steps 20–22). The base station makes a list of the channels determined to be inactive because of the lack of signal activity and sends this list to the controller as part of a request for an additional channel (step 24).

The cluster controller uses the list to enter its load statistics table 13. From this table the cluster controller determines if a first channel on the list is free (step 26). If this channel is free, the cluster controller allocates the channel to the requesting base station (steps 28 and 30). If this channel is in use, the cluster controller determines if a next channel on the list is free, and so forth, until it either finds a free channel or it checks every channel on the list. (steps 32–34).

Figure 4A:
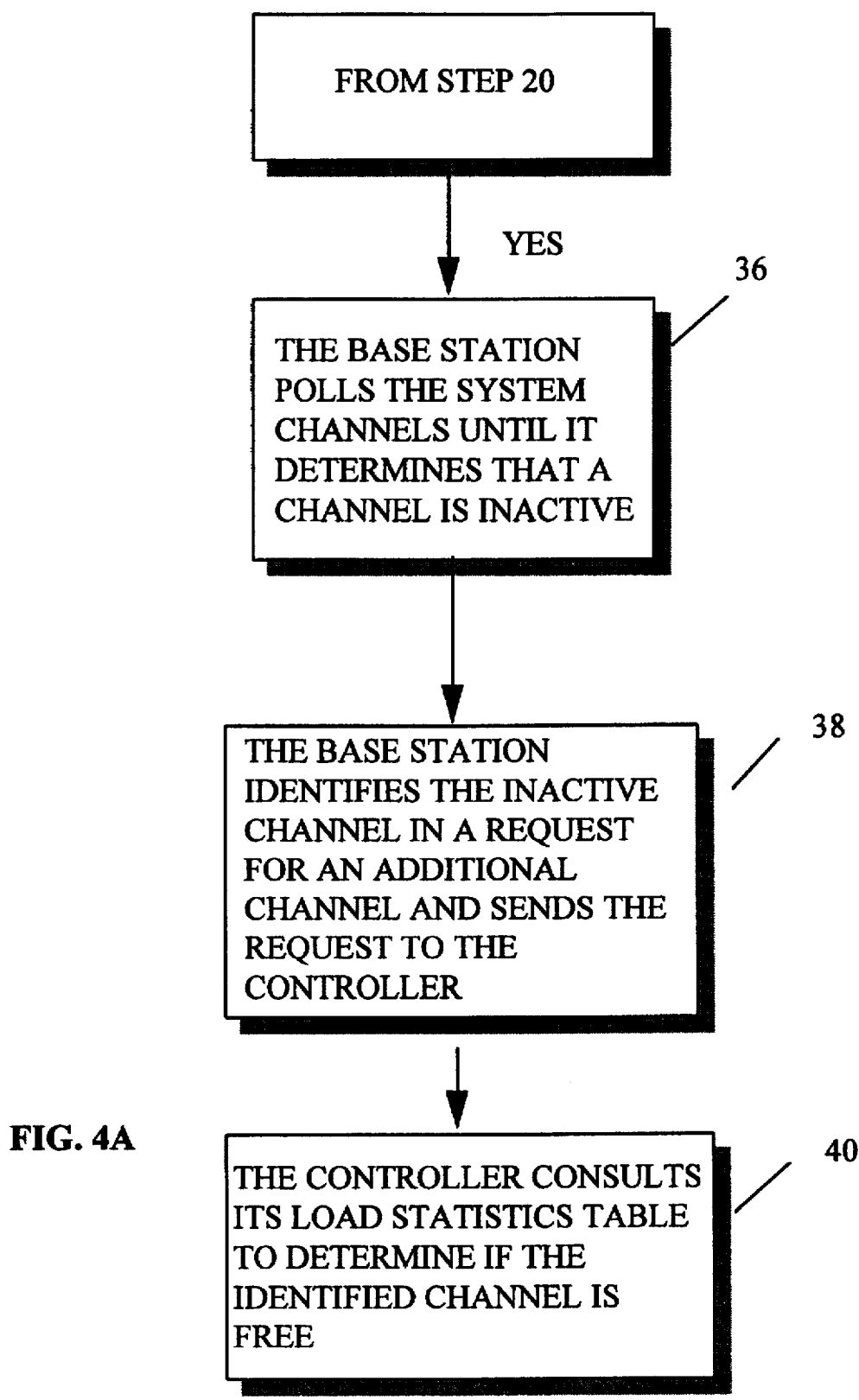
FIGS. 4A and 4B together are a flow chart of alternative operations of the cluster controller of FIG. 2.

If the cluster controller has checked all the channels on the list, the cluster controller then re-uses one of these channels, that is, it allocates the channel to the requesting base station without removing it from the station to which it is currently allocated (step 35) FIG. 4A. Since the requesting base station did not detect signal activity on the channel, communications over this channel within in its cell site should be undetectable at the other base station utilizing the same channel. Accordingly, the controller 12 need not separately determine if the re-use will cause interference, even if the cell sites to which the channel is to be simultaneously assigned are contiguous. The controller can thus take advantage of channel re-use, without requiring studies of the terrain, as is required in prior known systems.

Figure 4B:
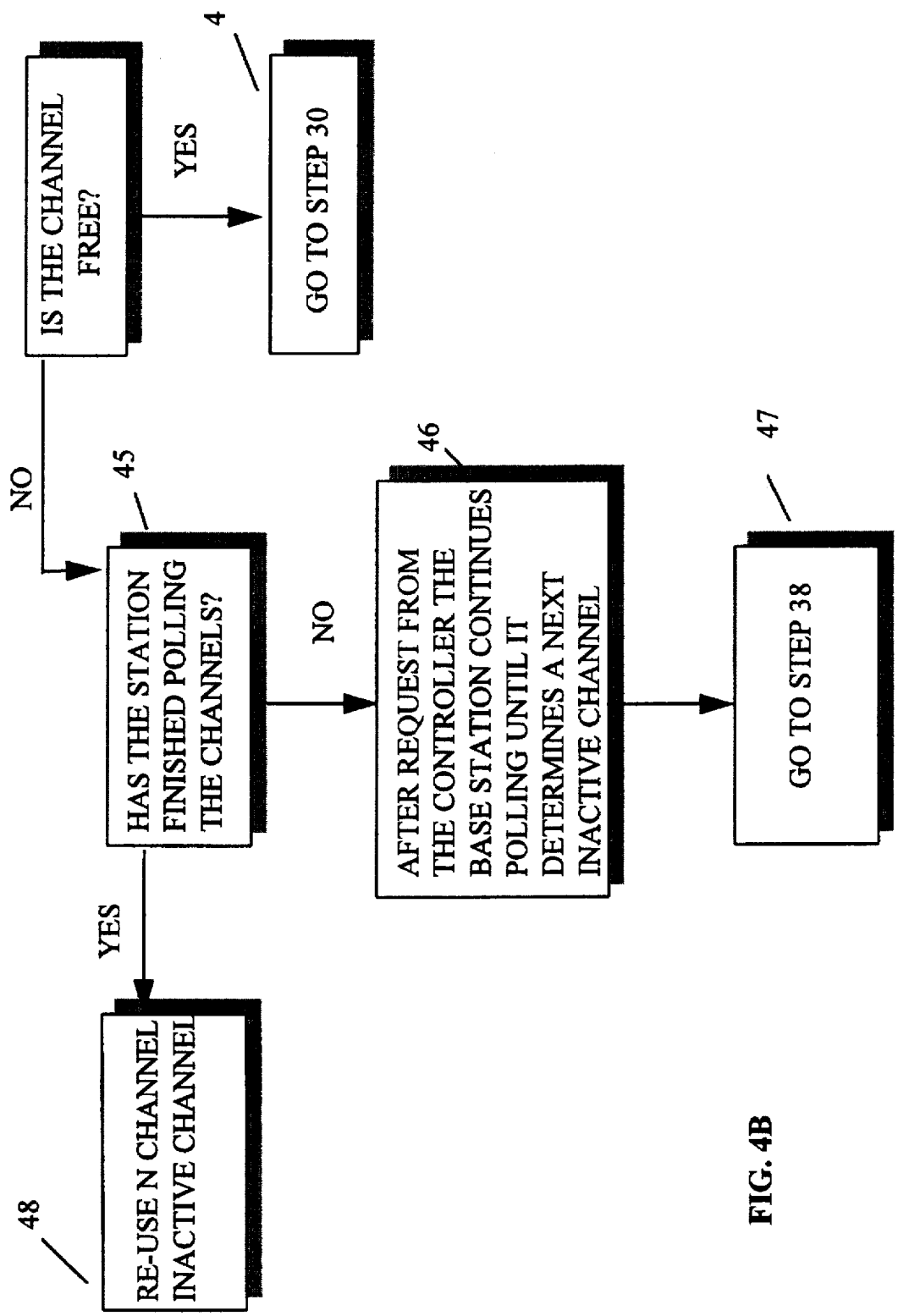

Referring now to FIGS. 4A–4B, in an alternative mode of operation the base station 14 polls the channels only until it finds an inactive channel (step 36). It then identifies only this channel in its request for an additional channel (step 38). The controller responds to this request by consulting the load statistics table 13 and determining if the channel is free (step 40). If so, the controller allocates the channel to the requesting base station (steps 42 and 44). If not, the controller requests that the base station continue polling the channels to find a next inactive channel, and so forth, until a channel is allocated to the requesting base station or all channels have been polled (steps 45–47). The controller may re-use a channel, as necessary (step 48).

Referring to FIG. 5, in a second embodiment of the system, the controller 12 includes in its load statistics table 13' information relating to the rates at which the base stations assign channels to the terminals. It thus accumulates the information forwarded to it by the base stations, determines how many times each base station assigns channels over a predetermined period of time and the number of these channels that are simultaneously in use over the predetermined time period. The controller then determines a channel usage rate for each of the base stations based on this accumulated information. If the rate for a particular base station is above a predetermined maximum value, it indicates that the base station requires all the channels allocated to it to handle current demand. Accordingly, the controller will not remove a channel from this base station.

Figure 6:
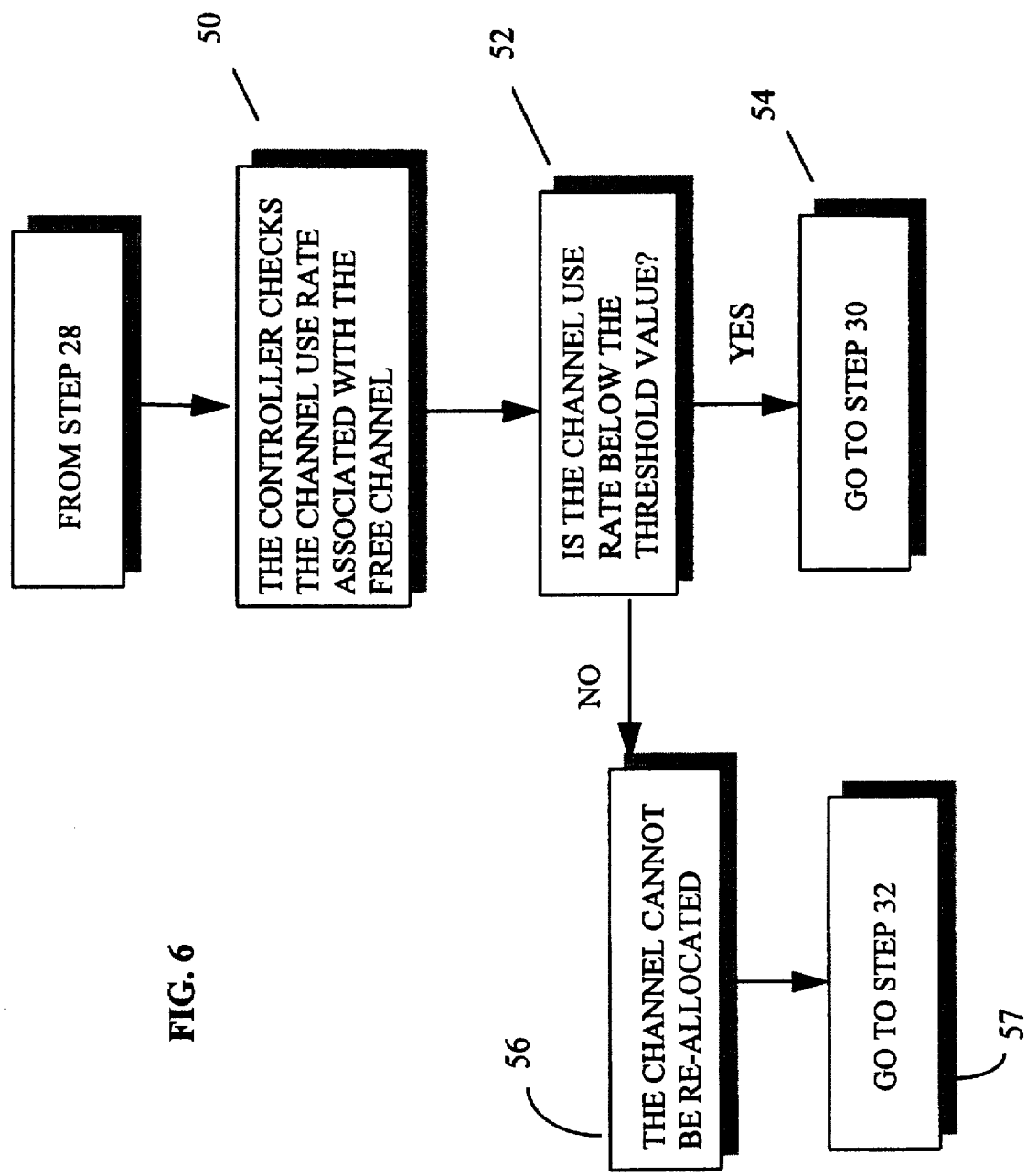
FIG. 6 is a flow chart of the operations of the cluster controller depicted in FIG. 5 and the plurality of wideband base stations depicted in FIG. 1.

Referring also to FIG. 6, when the controller receives a request for an additional channel from a base station, it first determines if any channels specified therein are free by executing the operations necessary to perform the steps 26–28 of FIGS. 3A–3B. Once a free channel is determined, the controller checks the channel usage rate associated with the base station to which the channel is allocated. If the rate is below the predetermine maximum, the controller allocates the channel from the current base station to the requesting base station (steps 50–54). If the rate exceeds the predetermined maximum, the controller determines that the channel cannot be reallocated (step 56). The controller then determines if a next channel on the list can be reallocated, and so forth (step 57). As appropriate, the channel can be re-used as described above.

The cluster controller, using either of these modes of operation, dynamically allocates channels to the base stations, within one or two seconds of receiving a request from a base station, taking only as long as it takes to enter the load statistics table using the list provided in the request by the base station. Accordingly, the base station can, without delay, service a terminal, using a newly re-allocated channel.

Referring to FIG. 7, in a third embodiment of the invention, the cluster controller accumulates in its load statistics table 13" information relating to the channel usage of each of the base stations over a number of predetermined time periods, for example, over weeks, days, hours and so forth. Using this accumulated information, the controller determines patterns of use and preallocates the channels among the base stations 14 at selected times, so that stations with expected high demand for channels have allocated to them at the appropriate time more channels than the stations which have at this same time expected low demand.

If, for example, the controller accumulates the channel usage information on a daily basis, it may determine that certain base stations have high demand during the week and others have correspondingly low demand during the week. The controller can thus preallocate more channels to these high demand base stations and fewer channels to these low demand base stations at the start of each week. Similarly, if the controller maintains information on the hourly usage of the channels, the controller may determine that certain base stations in the suburbs experience high demand during rush hours and low demand otherwise. The controller can then preallocate more channels to these base stations during rush hours and re-allocate channels from them during other hours.

Figure 8:
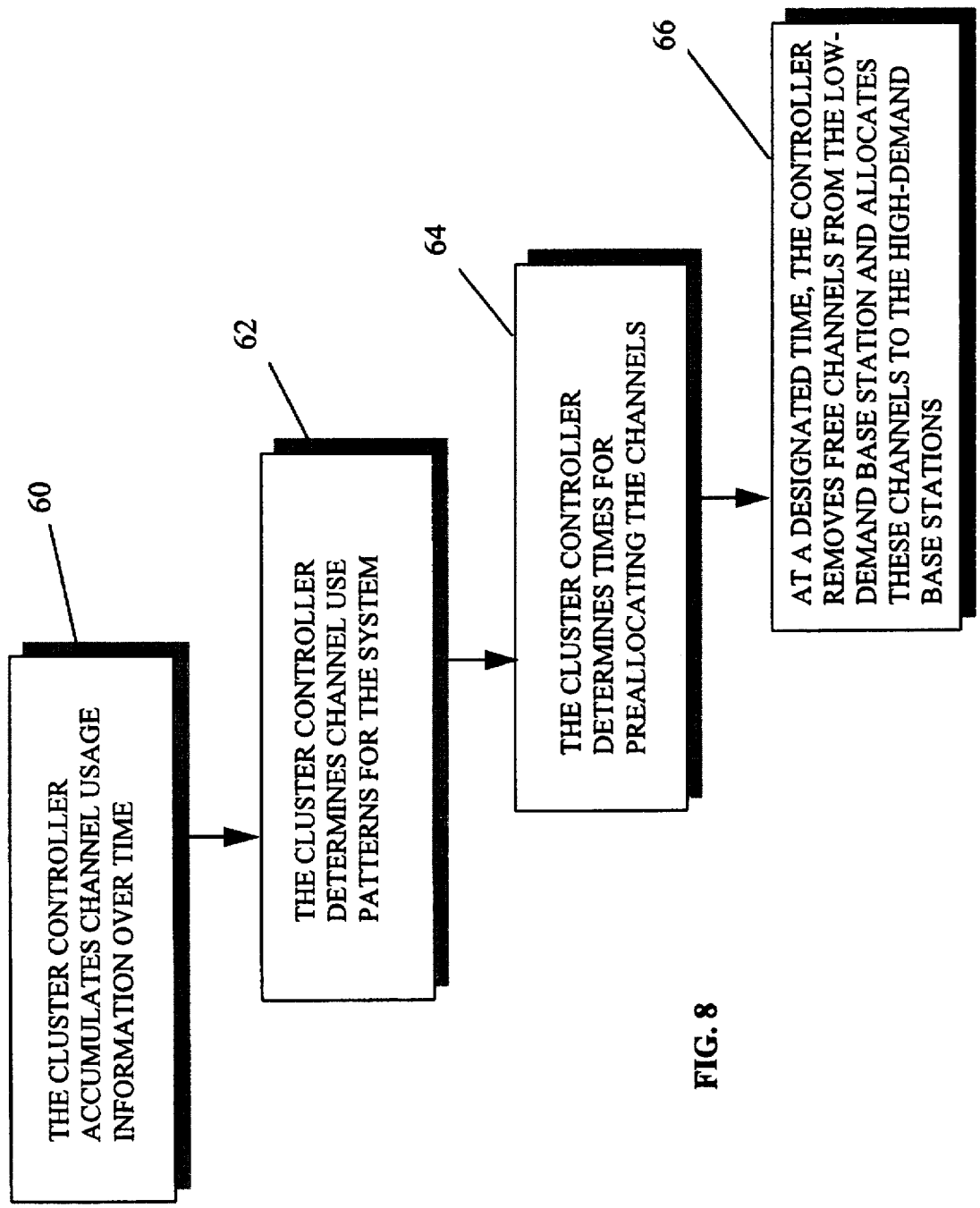
FIG. 8 is a flow chart of the operations of the cluster controller depicted in FIG. 4 and the plurality of wideband base stations depicted in FIG. 1.

Referring to FIG. 8, the cluster controller determines, from its accumulated channel usage information, patterns of use and the time period over which the usage predictably changes at particular base stations (steps 60–62). It then designates times for preallocating channels among the base stations in accordance with these patterns. At each of the designated times, the controller preallocates, to the base stations that are then expected to have high demand, free channels that are currently allocated to the base stations that are then expected to have low demand. At the same times, the controller removes these channels from the low-demand stations (steps 64–66). The controller avoids preallocating to base stations channels that may cause interference, for example, channels that are uses by a PCS in the area. Also, it does not re-use channels between contiguous base stations.

Referring now to FIG. 9, the base stations may request additional channels from the controller, as needed to handle unexpectedly high demand. For example, base stations located near a convention site may request additional channels to handle convention traffic. These base stations thus perform the operations described above with reference to steps 20–24 of FIG. 3A. In response to a request, the controller enters its load statistics table 13", using the channel information in the request and determines if a first channel on the list is free, as described above with reference to step 26 of FIG. 3A. If so, the controller determines if the associated channel usage rate exceeds the predetermined maximum rate, as described above with reference to step 50 of FIG. 6. If it does, the controller determines that this channel can not be reallocated to the requesting base station (steps 52 and 56 of FIG. 6). It then reenters the table and checks the availability of a next channel of the list, and so forth, until it determines that a particular channel is both free and not required to handle the current demand at the base station to which it is then allocated (steps 52–54 of FIG. 6).

The controller then examines the accumulated use statistics for the base station to which the channel is allocated, to determine if this base station is expected to experience high demand within the current time period, and thus, is expected to have a need for the channel (step 68), FIG. 9. If the base station is in a period of expected low demand, the controller allocates the channel to the requesting base station (step 70). If the base station is in a period of expected high demand, the controller instead determines that this channel should not be re-allocated and it again re-enters the table. The controller searches for another channel on the list that is free and that is assigned to a base station that is associated with a low current channel usage rate and is expected to have low demand (step 72).

If none of the free channels are assigned to base stations with expected low demand, the controller must determine, based on the priorities of the service provider, whether or not to remove a free channel from a base station that is expected to experience high demand.

Considering again the example of the city convention center, the base stations covering the center request additional channels in the evening, when demand in the city is expected to be low. The controller has already preallocated channels to the suburban base stations, in anticipation of the expected high demand. The controller must now determine if it should handle the convention calls by re-allocating channels to the city base stations and away from the base stations in the suburbs that are servicing its regular customers and which are experiencing their expected high demand. To do so would remove the channels from the areas then populated by its regular subscribers.

If the service provider places a high priority on having channels available for its regular subscribers, the controller will not reallocate channels from the suburban base stations to the convention-area base stations. If, however, the service provider has as its priority maximizing profits, the controller will reallocate as many channels as possible to the convention-area base stations, since the majority of these calls will be made on a high cost roaming basis by out-of-town convention goers.

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A wireless communication system including:
    A. a plurality of wideband base stations that service mobile telephone terminals over a plurality of channels within an assigned frequency range, each base station polling the channels within the assigned frequency range to determine inactive channels and requesting the allocation to the base station of one of the inactive channels;
    B. a controller for controlling channel allocation among the base stations, the controller accumulating channel use information from the base stations and allocating the channels among the base stations by allocating to a particular base station one of the channels that the base station determined to be inactive; and
    wherein the base stations include in the requests to the controller a list of inactive channels.

2. The wireless communication system of claim 1 wherein:
   a. each base station notifies the controller when the base station assigns one of the channels to one of the terminals and when the base station releases the channel from the terminal; and
   b. the controller maintains a load statistics table indicating the status of each channel.

3. The wireless communication system of claim 2 wherein the controller consults the table to determine if a particular channel, which is listed in the request from the base station, is free over the system.

4. The wireless communication system of claim 2 wherein the controller accumulates the channel use information over a number of predetermined time periods and determines for each base station a channel usage rate at which the base station assigns channels to the terminals, the controller allocating a channel from a base station to which the channel is currently assigned to a requesting a base station if the channel usage rate associated with the base station to which the channel is currently assigned is below a predetermined value.

5. The wireless communication system of claim 4 wherein the controller accumulates information for each base station relating to the number of channels in use simultaneously and includes these numbers in calculation of the channel usage rates for the base stations.

6. The wireless communication system of claim 5 wherein the controller determines from the accumulated channel use information for each base station an expected channel use, the controller allocating a channel from a current base station to a requesting base station if the expected channel use associated with the current base station during the current time period is low.

7. The wireless communication system of claim 1 wherein the channel allocated to a particular base station is one that the controller determines is not in use at any other base station.

8. A method of dynamically allocating channels among a plurality of wideband base stations including the steps of:
   A. maintaining a table of channels in a controller;
   B. determining from the base stations the current status of channels and including in the table of channels an indication for each channel that the channel is either in use or free;
   C. requiring a base station requesting a channel allocation to include in the request a list of channels determined by the base station to be inactive;
   D. determining the current status of a first channel on the list;
   E. allocating the channel to the requesting base station.

9. The method of claim 8 wherein:
   E11. the step of allocating the channel to the requesting base station is performed if the channel is free; and further comprising the steps:
   F. otherwise determining if a next channel on the list is free and if so allocating the channel to the requesting base station; and
   G. repeating step F until either a channel is allocated or the status of every channel on the list has been checked.

10. A method of dynamically allocating channels among a plurality of wideband base stations including the steps of:
    A. maintaining a table of channels in a controller:
    B. determining from the base stations the current status of channels and including in the table of channels an indication for each channel that the channel is either in use or free;
    C. accumulating channel status information and determining for each base station a channel usage rate which indicates the number of times the base station assigns channels to terminals over a predetermined time period;
    D. requiring a base station requesting a channel allocation to include in the request a list of channels determined by the base station to be inactive;
    E. determining the current status of a first channel on the list;
    F. determining if the channel usage rate associated with the base station to which the channel is allocated is below a predetermined value;
    G. re-allocating the channel to the requesting base station if the associated channel usage rate is below the predetermined value;
    H. otherwise, determining if the channel usage rate associated with a next channel on the list is below the predetermined value;
    I. repeating steps G and H until either a channel is allocated or every channel on the list has been checked.

11. The method of claim 10 wherein the step of determining the channel usage rate includes determining the number of channels in use simultaneously over the predetermined period of time and using the number in determining the channel usage rate.

12. The method of claim 10 wherein:
    F1. the step of determining if the channel usage rate associated with the base station to which the channel is allocated is below a predetermined value is performed if the channel is free; and
    H1. the step of determining if the channel usage rate associated with a next channel on the list is below the predetermined value is performed if the next channel on the list is free.

13. A method of dynamically allocating channels among a plurality of wideband base stations including the steps of:
    A. maintaining a table of channels in a controller;
    B. determining from the base stations the current status of channels and including in the table of channels an indication for each channel that the channel is either in use or free;
    C. accumulating channel status information and determining for each base station a channel usage rate at which the base station assigns the channels allocated to the base station to mobile telephone terminals;
    D. requiring a base station requesting a channel allocation to include in the request a list of channels determined by the base station to be inactive;
    E. determining the current status of a first channel on the list;
    F. determining if the channel usage rate associated with the base station to which the channel is currently allocated is below a predetermined value;
    G. allocating the channel to the requesting base station if the associated channel usage rate is below the predetermined value;
    H. otherwise, determining if the channel usage rate associated with the base station to which a next channel on the list is allocated is below the predetermined value; and
    I. repeating steps G and H until either a channel is allocated or the status of every channel on the list has been checked.

14. The method of claim 13 wherein:

a. the step of determining the channel usage rate for the base station includes determining an expected channel usage rate over a predetermined time period; and b. the step of determining if the channel usage rate is below the predetermined value includes determining if the expected rate is below the predetermined value.

15. The method of claim 14 further including the step of preallocating channels among the base stations at predetermined times based on the expected rate of channel usage, a number of the channels currently allocated to base stations having low expected channel usage rates being reallocated to base stations having high expected channel usage rates.

16. The method of claim 13 wherein:

F1. the step of determining if the channel usage rate associated with the base station to which the channel is currently allocated is below a predetermined value is performed if the channel is free; and H1. the step of determining if the channel usage rate associated with the base station to which a next channel on the list is allocated is below the predetermined value is performed if the next channel on the list is free.

17. A method of dynamically allocating channels among a plurality of wideband base stations including the steps of:

A. maintaining a table of channels in a controller;

B. determining from the base stations the current status of channels and including in the table of channels an indication for each channel that the channel is either in use or free;

C. accumulating channel status information and determining for each base station a channel usage rate at which the base station assigns the channels allocated to the base station to mobile telephone terminals;

D. determining patterns of use over all the base stations;

E. preallocating channels among the base stations based on the patterns of use;

F. designating times at which the patterns of use change and pre-allocating channels at the designated times; and further including the step of, for each base station:

a. determining the number of channels in use simultaneously over a predetermined period of time;

b. determining over the predetermined time period the number of channels assigned to the terminals; and c. determining a channel usage rate based on the results of steps a and b;

wherein if the channel usage rate is above a predetermined value the channel is not re-allocated from the base station to which the channel is currently allocated.

18. The method of claim 17 further including the steps of

F. requiring a base station requesting a channel allocation to include in the request a list of channels determined by the base station to be inactive;

G. determining the current status of a first channel on the list;

H. determining if the channel usage rate associated with the base station to which the channel is currently allocated is below the predetermined value;

I. allocating the channel to the requesting base station if the associated channel usage rate is below the predetermined value;

J. otherwise, determining if the channel usage rate associated with the base station to which a next channel on the list is allocated is below the predetermined value; and K. repeating steps I and J until either a channel is allocated or the status of every channel on the list has been checked.

19. The method of claim 18 wherein:

H1. the step of determining if the channel usage rate associated with the base station to which the channel is currently allocated is below the predetermined value is performed if the channel is free; and J1. the step of determining if the channel usage rate associated with the base station to which a next channel on the list is allocated is below the predetermined value is performed if the next channel on the list is free.

* * * * *